Figure 4:
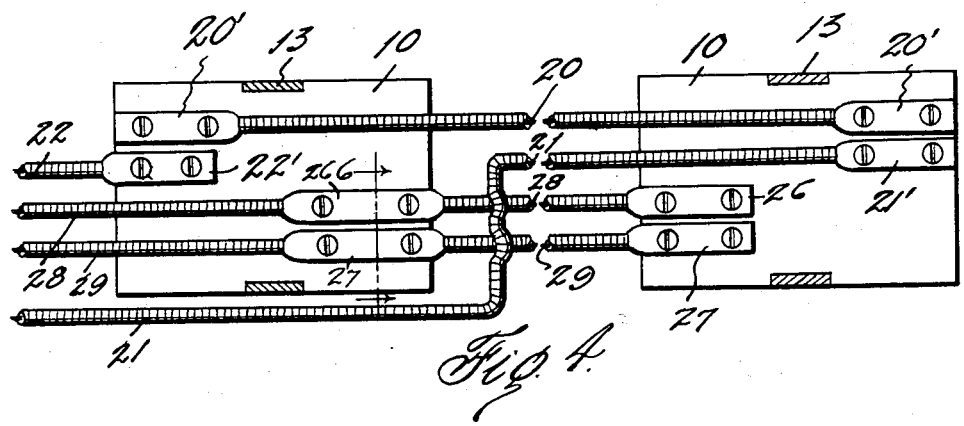

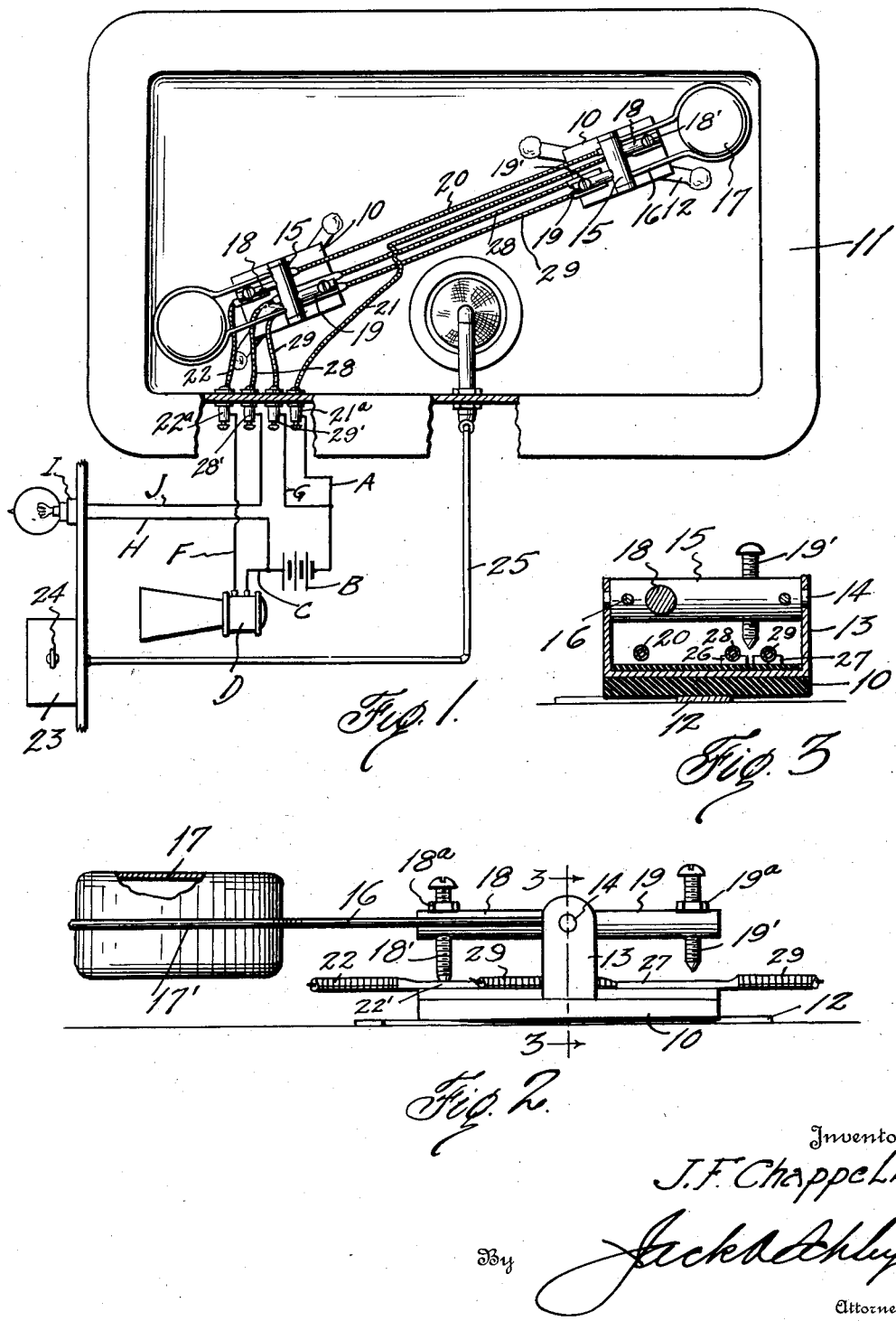

Dec. 15, 1925.                                                                1,566,182
J. F. CHAPPELL
OIL LEVEL INDICATING DEVICE
Filed May 20, 1921                2 Sheets-Sheet 2

Inventor
J. F. Chappell
By Jack A. Ashley
Attorney

Patented Dec. 15, 1925.

1,566,182

UNITED STATES PATENT OFFICE.

JAMES F. CHAPPELL, OF DALLAS, TEXAS, ASSIGNOR, BY DIRECT AND MESNE ASSIGNMENTS, TO AUTOMATIC OIL CONTROLLER COMPANY, OF DALLAS, TEXAS, A CORPORATION OF DELAWARE.

OIL-LEVEL-INDICATING DEVICE.

Application filed May 20, 1921. Serial No. 471,236.

*To all whom it may concern:*

Be it known that I, JAMES F. CHAPPELL, a citizen of the United States, residing at Dallas, in the county of Dallas and State of Texas, have invented certain new and useful Improvements in Oil-Level-Indicating Devices, of which the following is a specification.

This invention relates to new and useful improvements in oil level indicating devices.

The invention seeks to overcome many objections possessed by oil level indicating devices which have heretofore been developed and to accomplish certain desirable results which will make for a practical device.

The life and performance of a motor vehicle engine depends largely upon lubrication. While too little or no oil is a serious condition, too much oil is also objectionable and detrimental. A device to be practical should indicate a high oil level as well as a low oil level. A fault found in oil level indicators, is a false indication occasioned usually by an acute inclination of the car to one side or when on an inclination of considerable degree, which causes the float to descend and close the circuit while there is still an adequate supply of oil in the crank case.

The object of my invention is to provide an indicator which will function under predetermined conditions and at predetermined periods and one which will not function, except, only under such conditions and periods; thereby avoiding false indications and assuring a positive and accurate device. A further object of the invention is to provide an indicating device which will not be affected by transverse or longitudinal inclinations of the vehicle, or function prematurely.

In carrying out the invention two or more floats are disposed diagonally with relation to the transverse and longitudinal axes of the motor, whereby the floats will be on opposite sides of the transverse axis and on opposite sides of the longitudinal axis, thus assuring that when the motor is on an incline, one float will be elevated by the oil when the other is lowered. By connecting the floats with electrically operated signal devices, it is obvious that said signal devices can function only when both of said floats are lowered which can only occur when the oil reaches its minimum level. By arranging each float to close an electric circuit to a signal, it will be impossible to place too much oil in the crank case without operating the signal, irrespective of the inclination of the motor. Suitable signal devices are connected in such a manner as to be operated when either float has reached the maximum oil level, but only when both floats reach the low oil level.

A construction designed to carry out the invention will be hereinafter described together with other features of the invention.

Figure 5:
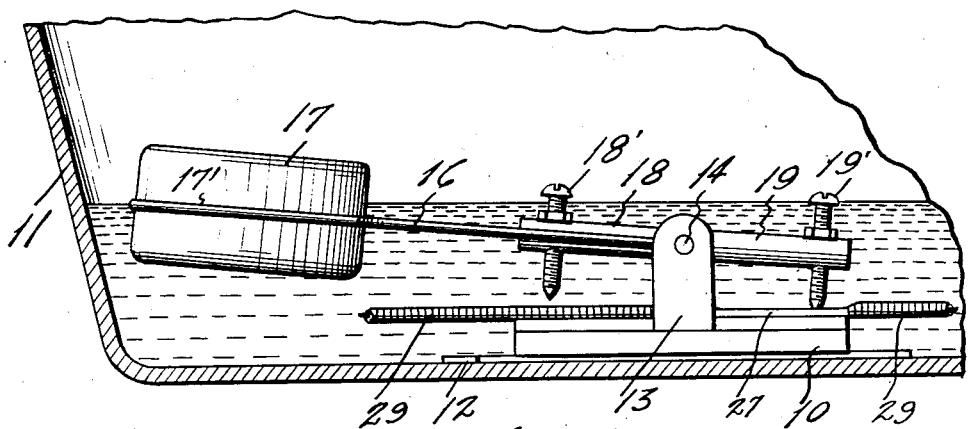
Figure 6:
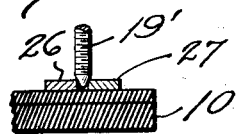

The invention will be more readily understood from a reading of the following specification and by reference to the accompanying drawings, in which an example of the invention is shown and wherein:

Fig. 1 is a plan view of a device constructed in accordance with my invention and arranged in the crank case of a motor, together with a circuit diagram including the signal devices, Fig. 2 is a side elevation of one of the float structures, showing the float at the low level position, Fig. 3 is a cross sectional view on the line 3—3 of Fig. 2, Fig. 4 is a plan view of the base plate, contacts and wires, Fig. 5 is a sectional detail thru a portion of the crank case and showing one of the float structures, with the float in the maximum oil level position, and Fig. 6 is a sectional detail of one of the contacts.

In the drawings the numeral 10 designates a base plate which is preferably made of insulating material or arranged to be insulated from the bottom of the crank case 11, to which it is suitably attached. Two or more of these base plates are employed, one for each float. In Fig. 1, I have shown two of such base plates attached to the bottom of the crank case 11 by strips 12 which are suitably secured to the crank case and also to the plates. The plates are disposed diametrically opposite so as to be on each side of the transverse and longitudinal axes of the crank case.

Each plate is provided with a pair of upstanding ears 13, which receive the trunnions 14 of a transverse rocker bar 15.

Each bar receives the inner ends of a yoke arm 16, which is preferably formed of self sustaining wire. Each arm has a loop 17' at its outer end snugly embracing a float 17, which is preferably made of metal and in a suitable manner. As the float moves up and down, the bar 15 will be rocked as is obvious. From each bar 15, a contact member or arm 18 extends outwardly within the yoke arm 16; while a second contact arm 19 extends from the opposite side of the bar and is offset laterally from the arm 18. The arm 18 is provided with a contact member 18' which is preferably in the form of a screw and is threaded thru the outer end of said arm. A lock nut 18ᵃ is provided on the screw and is tightened against the arm so as to fasten the screw in its adjusted position. The arm 19 also has a contact member in the form of a screw 19' and a lock nut 19ᵃ.

In the drawings I have shown two base plates 10. These two plates are connected by a wire 20 which may be suitably insulated. This wire is connected at each end with a contact plate 20' fastened on the base plate in a suitable manner. On one of the base plates is mounted a contact plate 21' in parallel relation to the plate 20', and spaced a short distance therefrom; while on the other plate 10, a contact plate 22' is spaced a short distance from the plate 20' and in parallel relation thereto. A wire 21 extends from the plate 21' to a binding post 21ᵃ in the wall of the crank case 11, while a wire 22 extends from the plate 22' to a binding post 22ᵃ also mounted in the side wall of said crank case. The contact plates are arranged so that the lower pointed ends of the contact screws will engage therebetween as is shown in Fig. 6, and establish a circuit connection between the two plates. The screws 18' engage between the plates 20' and 21' and 20' and 22', when the floats 17 swing downward to their lowest extremity.

It will be seen that by adusting the screws 18' vertically the downward swing of the float is regulated and the level at which the contacts will be made is predetermined and established. Each float is supported by the oil in the crank case and when the level of the oil is low enough, the contact will be made. A circuit wire A leads from the post 21ᵃ and is connected with a battery or other source of electrical energy B which in turn is connected by means of a circuit wire C with an electric horn or other audible signal device D. A wire F extends from the horn to the binding post 22ᵃ. It will be seen at a glance that the circuit is broken at two points and unless connection is made between the plates 20' and 21' and 20' and 22' the circuit to the horn will not be closed. Consequently both of the floats 17 must be swung downward so that their screws 18' engage between the contact plates above enumerated, in order to close the circuit and sound an alarm. It is equally obvious that when the motor is inclined so that the oil is displaced and one float swung downward the other float will be elevated, so long as there is sufficient oil in the crank case to elevate said float. Thus it is impossible to close the circuit and energize the horn so long as there is sufficient oil in the crank case to operate the engine. When the oil reaches a minimum level both floats will descend sufficiently to permit their screws 18' to contact with the plates and close the circuit, but this cannot happen until such a level is reached. This is a very important feature because it makes an accurate indication and prevents the supplying of oil to the crank case when the same is not needed. By arranging the floats diagonally it is impossible to close both contacts so long as there is sufficient oil in the crank case, irrespective of the position, that the crank case would assume under any condition encountered in driving a motor vehicle.

In Fig. 1 I have shown an oil tank 23, provided with a suitable cut off 24 for controlling the flow of the oil from the tank thru a pipe 25, which latter has connection with the crank case 11. When the oil reaches a minimum level and the horn B begins to blow and continues to blow, the driver is informed that oil is needed. By operating the valve 24 oil is supplied thru the pipe 25 to the crank case so that either one or both of the floats 17 is elevated and the horn circuit broken. However, unless the driver is informed he is likely to supply too much oil to the crank case, thus committing one evil in an attempt to correct another evil.

My invention includes means for indicating a maximum oil level. On the base plates 10 I mount contact plates 26 each of which is parallel and slightly spaced from a contact plate 27. The plates 26 are connected in a wire 28 and the plates 27 are connected in a wire 29. The plates 26 and 27 are located so as to be engaged by the points of the contact screws 19' and the circuits between the wires 28 and 29 closed when either float is elevated sufficiently to bring a screw 19' into contact with said plates. The wire 28 is connected to a binding post 28' and wire 29 is connected with a binding post 29'. A circuit wire G leads from the post 29' to the battery wire A, while a circuit wire H leads from the battery wire C to an electric lamp mounting I, from which a wire J, extends to the binding post 28'. It will be seen when sufficient oil has been supplied to raise one of the floats, whereby its screw 19' will engage between the plates 26 and 27, and close the circuit over the wires 28 and 29 as just described, the lamp will be illuminated, thus indicating that enough oil has been supplied to the crank case and preventing the addition of too much oil or the flooding of the crank case. A suitable switch for cutting off the light, except when needed, may be employed. The tank 23 may be mounted over the engine so as to keep the oil in a fluent condition, but this is not essential. The electric lamp may be mounted on the instrument board or at any other place within the vision of the driver.

Various changes in the size and construction of the parts as well as modifications, may be made without departing from the spirit of the invention.

What I claim is:

1. In an oil level indicating device, a tank, a pair of floats, means for mounting said floats in said tank opposite each other and on opposite sides of the transverse and longitudinal axes of said tank, a maximum level electric signal, a minimum level electric signal, a circuit for said maximum signal including circuit closing means comprising said floats for closing said circuit when either float is raised to a predetermined level, a circuit for said minimum level signal including circuit closing means comprising said floats for closing said circuit only when both of said floats are lowered to a predetermined level.

2. In an oil level indicating device, a tank, a pair of floats in said tank opposite each other and on opposite sides of the transverse and longitudinal axes of said tank, a maximum level electric signal, a minimum level electrical signal, a circuit for said maximum signal, a second circuit for the minimum signal, each float carrying a contact for closing the maximum signal circuit, each float also carrying another contact for closing the minimum circuit, said minimum circuit having two gaps arranged to be closed by the said second contacts of the floats when both of said floats are lowered to a predetermined level.

3. In an oil level indicating device, a tank, a pair of float mountings in said tank opposite each other and on opposite sides of the transverse and longitudinal axes of the said tank, floats fulcrumed on said mountings, each float having circuit closing means on each side of its fulcrum operating alternately, a maximum level signal, a maximum level signal circuit having contacts engaged by the closing means on one side of the fulcrum of each float, a minimum level signal, a minimum electric signal circuit having two contacts located to be engaged by the circuit closing means on the opposite side of the fulcrums of the floats.

In testimony whereof I affix my signature.

JAMES F. CHAPPELL.